US009261770B2

(12) United States Patent
Janssens

(10) Patent No.: US 9,261,770 B2
(45) Date of Patent: Feb. 16, 2016

(54) APPARATUS AND METHOD FOR COMBINING LASER BEAMS OF DIFFERENT POLARIZATION

(75) Inventor: Peter Janssens, Ghent (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 13/877,473

(22) PCT Filed: May 31, 2012

(86) PCT No.: PCT/EP2012/060274
§ 371 (c)(1),
(2), (4) Date: Apr. 3, 2013

(87) PCT Pub. No.: WO2012/164031
PCT Pub. Date: Dec. 6, 2012

(65) Prior Publication Data
US 2014/0092364 A1    Apr. 3, 2014

(30) Foreign Application Priority Data

Jun. 1, 2011 (GB) .................................. 1109208.7

(51) Int. Cl.
*G03B 35/26* (2006.01)
*G03B 21/20* (2006.01)
(Continued)

(52) U.S. Cl.
CPC ................ *G03B 35/26* (2013.01); *F21V 13/00* (2013.01); *G03B 21/2013* (2013.01); *G03B 21/2033* (2013.01); *G03B 21/2073* (2013.01); *H04N 9/3161* (2013.01); *H04N 9/3167* (2013.01)

(58) Field of Classification Search
CPC ...... G02B 27/1033; F21V 9/14; G03B 35/26; G03B 21/14

USPC .............................................. 353/8, 9; 348/46
See application file for complete search history.

(56) References Cited

U.S. PATENT DOCUMENTS 8,388,138 B1 * 3/2013 Boothroyd ..................... 353/7
2003/0020809 A1   1/2003 Gibbon et al.
(Continued)

FOREIGN PATENT DOCUMENTS

DE   10 2007 002 498 A1   1/2008
DE      102007002498 A1 *  1/2008   ................ H01S 5/40

OTHER PUBLICATIONS

Office Action for corresponding European patent application No. 12 738 414.7 dated Sep. 9, 2013.
(Continued)

*Primary Examiner* — William C Dowling
*Assistant Examiner* — Jerry Brooks
(74) *Attorney, Agent, or Firm* — Renner, Otto, Boisselle and Sklar, LLP

(57) ABSTRACT

The present invention provides a light source apparatus (10) for use with a projector (80) and a method for combining laser beams of different polarization characterized in that an overall efficiency for the reflection and transmission exceeding 97% is achieved. A first white laser light beam (18) having a first polarization is combined with a second white laser light beam (28) having a second polarization that is orthogonal to the first polarization by utilizing a multi narrow-band polarizing beam splitter (20) positioned to receive the first and the second white laser light beams (18, 28). Embodiments of the present invention utilize two laser light sources (12, 22) emitting two sets of laser light beams with multiple wavelengths (14, 15, 16 and 24, 25, 26).

18 Claims, 5 Drawing Sheets

(51) Int. Cl.
*H04N 9/31* (2006.01)
*F21V 13/00* (2006.01)

(56) References Cited

U.S. PATENT DOCUMENTS

| | | | |
|---|---|---|---|
| 2006/0001842 A1* | 1/2006 | Engle | 353/94 |
| 2007/0008694 A1* | 1/2007 | Yang et al. | 361/685 |
| 2007/0058143 A1 | 3/2007 | Penn et al. | |
| 2009/0141242 A1 | 6/2009 | Silverstein et al. | |
| 2009/0213330 A1* | 8/2009 | Silverstein et al. | 353/8 |
| 2012/0038892 A1* | 2/2012 | Kurtz et al. | 353/31 |

OTHER PUBLICATIONS

International Search Report and Written Opinion issued in connection with PCT/EP2012/060274, filed May 5, 2012, in the name of Barco N.V.

* cited by examiner

APPARATUS AND METHOD FOR COMBINING LASER BEAMS OF DIFFERENT POLARIZATION

CROSS-REFERENCE TO RELATED APPLICATIONS

This application is a §371 national stage entry of International Application No. PCT/EP2012/060274, filed May 31, 2012, which claims priority to GB Application No. 1109208.7, filed Jun. 1, 2011, the entire contents of which are incorporated herein by reference.

TECHNICAL FIELD OF THE INVENTION

The present invention relates to polarizing beam splitters and methods of using them, more particularly, to a multi narrow-band polarizing beam splitter (PBS) and a method for combining laser beams having different polarization states as well as to projection devices using such beam splitters.

BACKGROUND OF THE INVENTION

Projection systems require a high quality light source. While projection systems have traditionally used discharge lamps as a light source, there is now interest in alternative light sources such as lasers. Lasers have several advantageous properties. They emit a high intensity light beam and have a very long operating lifetime. Laser light is collimated and has a narrow spectrum.

Even if laser sources have a very low étendue, when building a very high brightness projector from several individual laser modules each has a certain tolerance on the beam angles, and it becomes challenging to combine the light from different laser modules in the available &endue from a projection system. Adjustable stages can be used to mitigate some of the beam tolerances but add significant expense and alignment effort. Since lasers produce polarized light, two laser beams with orthogonal polarization can be combined without increasing the étendue by using a polarizing beam splitter (PBS).

For example, US 2009/0141242 A1 describes a digital image projector comprising a first polarized light source, a second polarized light source that is orthogonal in polarization state to the first polarized light source, a PBS disposed to direct light of either the first or the second polarization along a common illumination axis, a MEMS spatial light modulator, and projection optics for delivering imaging light from the MEMS spatial light modulator. Improved étendue matching between illumination and modulation components is achieved.

Such a combination of two laser beams with orthogonal polarization, in which the light flux for both polarization directions is balanced, is also advantageous if a Digital Light Processing (DLP) projector is used in combination with an external polarization system. For such application, it is important that either the light from the projector is fully polarized or that both polarization directions are represented equally. Without special measures, the original polarization from the laser source will be disturbed, in a manner that is different from one primary color with respect to another and that is non-uniform across the image. As a result the three-dimensional (3D) image produced with an external polarization system will suffer from discoloration and severe non-uniformities. Even worse, if moving components that suffer from birefringence are included in the optical path (such as a moving diffuser), the discoloration will vary over time.

Several solutions are known in the art to combine light rays with orthogonal polarization. Most PBS combiners use the principle that at a well defined incident angle (known as the Brewster angle) only s-polarized light is reflected, and apply a number of dielectric coating layers. PBS cubes typically show a very high reflection for s-polarized light (>99.5%), but the transmission for p-polarized light is rather low (about 90%-95%). Wire grid polarizers typically have efficiencies below 90% in both reflection and transmission. Further, in wire grid polarizers some of the energy is absorbed, which may lead to damaging the component at high illumination levels.

The majority of known polarizing beam splitters are generally designed for operation in broad ranges of wavelengths. However, the use of such broadband dichroic PBS results in relatively high light losses when broad spectral signals are transmitted while light in narrow wavelength bands is reflected. Furthermore, a broadband PBS can not reach efficiencies higher than 90 to 95% for angles different from the Brewster angle. This makes it difficult to combine two orthogonally polarized broadband light sources in an efficient way.

Efficiency is very important in designing a high brightness laser projector. Laser light is expensive and, therefore, a lower efficiency represents an important cost increase. With the currently known devices and methods for combining multiple laser beams of different polarization this can not be achieved.

SUMMARY OF THE INVENTION

It is an object of the present invention to provide an alternative light source apparatus for use with a projector and an alternative method for combining laser beams of different polarizations. An advantage of embodiments of the present invention is that an overall efficiency for the reflection and transmission exceeding 97% can be achieved.

Embodiments of the present invention utilize a first and a second laser light source outputting a first white laser light beam with a first polarization and a second white laser light beam with a second polarization that is orthogonal to the first polarization. Embodiments of the present invention utilize further a multi narrow-band polarizing beam splitter (operated as a beam combiner) positioned to receive the first and said second white laser light beams for combining the first and second polarizations.

In particular, a projection system is provided with two laser light sources arranged to output two sets of laser light beams whose polarizations are orthogonal to each other and a multi narrow-band polarizing beam splitter positioned at an angle of about 45° between the first and second laser light beams. The sets of laser light beams may be provided at multiple wavelengths for three or more primary colours; red, green and blue or more.

Preferably, the polarizing beam splitter includes a multi-layer dichroic coating or a rugate filter that may be embedded in an optical medium.

Furthermore, the polarizing beam splitter may be preferably designed to have a half cone angle of 5° or smaller. The polarizing beam splitter may further be optimized over three or more narrow spectral ranges, such as for the colours red, green, and blue or more, instead of over the complete visible spectrum resulting in the achievement of higher efficiencies.

Preferably, the laser light beams of each set are overlaid using a plurality of filters such as dichroic filters to create the first and second white laser light beams having an orthogonal polarization relative to each other. These two white laser light beams are then combined by the multi narrow-band polarizing beam splitter operated as a beam combiner. The PBS, the filters and optionally the light sources may be supplied as an up-grade kit for an existing projector or other device.

In embodiments of the present invention, a projector is provided in which two white laser light beams are combined by the multi narrow-band polarizing beam splitter operated as a beam combiner. In embodiments of the present invention the output beam of the PBS is supplied to an integrator assembly. The integrator may receive the combined laser light beam via a condenser lens.

In accordance with one embodiment of the present invention, the integrator assembly may include at least two integrator elements, such as a rod or a light pipe integrator, and light diffusing elements positioned ahead of each of the integrator assemblies. The first integrator is adapted to receive light from the laser light source and to provide a substantially uniform brightness across the surface of the exit of the integrator, the light from the laser light source passing through the first integrator so that the light distribution is transformed to fill the entire cross section of the end of the first integrator, the laser light emerging from the first integrator being at a discrete number of angles with angular gaps, and the second integrator receives light from the first integrator and is adapted such that at least some of the gaps are filled.

The diffusing element such as a diffuser or a diffractive element or a lenslet array or a refractive prism array or a holographic element can be stationary or moving. The number of individual laser emitters contributing to each wavelength is preferably sufficiently high so that the diffusing element such as a diffuser or a diffractive element or a lenslet array or a refractive prism array or a holographic element can be static.

In some embodiments, a projector system is provided with a laser light source with multiple wavelengths for at least one primary color. Preferably the projector further comprises a light integrator system. The light integrator system can have a first and second integrator, whereby for each of the wavelengths the first integrator is adapted to receive light from the laser light source and provides a substantially uniform brightness across the surface of the exit of the integrator. The light from the laser light source passing through the first integrator is such that the light distribution is transformed to fill the entire cross section of the end of the first integrator. The laser light emerging from the first integrator preferably is at a discrete number of angles with angular gaps, and the second integrator receives light from the first integrator and is adapted such that at least some of the gaps are filled.

Preferably, the entire angular space is filled. The light may experience a number of discrete reflections in the first integrator, e.g. if the first integrator is a rod.

The multiple wavelengths can be generated by multiple laser emitters or for example the multiple wavelengths can be generated by multiple laser packages.

Preferably the conditions of uniform brightness and uniform filling of the available angular space are fulfilled at each moment in time or if there are variations with time these occur at a frequency that is above the frequency that the eye can distinguish.

In embodiments of the present invention laser light sources with multiple wavelengths for at least one primary color can separated by >0.5 and <2 nm.

In accordance with further embodiments of the present invention, the integrator assembly may include at least two integrator elements, a first light diffusing element positioned ahead of said integrator element, and a second light diffusing element positioned in between the two integrator elements. The first light diffusing element may be arranged to receive a laser light beam and forward a plurality of laser light beams at a range of angles. The integrator assembly may be characterized in that for each of the wavelengths a substantially uniform brightness across the surface of the light modulator is achieved. The two integrator elements may be, for example, a rod or a light pipe integrator. Alternatively, any one of the two integrator elements may be a fly-eye integrator.

The present invention provides a method for providing a light beam for use in a projector, the method comprising the steps of:

overlaying a first plurality or laser light beams of different wavelengths to generate a first white laser light beam having a first polarization, overlaying a second plurality or laser light beams of different wavelengths to generate a second white laser light beam having a second polarization that is orthogonal to the first polarization combining said first and second white laser light beams into a single white light beam so that said first and second polarizations are maintained;

wherein an overall efficiency of the overlaying and combining exceeds 97%.

The method may include the steps of:

outputting a first set of laser light beams at multiple wavelengths for three or more primary colours;

outputting a second set of laser light beams at multiple wavelengths for three or more primary colors;

overlaying the first set of laser light beams thereby creating said first white laser light beam;

overlaying the second set of laser light beams thereby creating said second white laser light beam.

Further embodiments of the present invention are detailed in the attached claims.

BRIEF DESCRIPTION OF THE DRAWINGS

Embodiments of the present invention will now be described, by way of example only, with reference to the accompanying drawings, in which.

Corresponding reference characters indicate corresponding parts throughout the several views. The exemplification set out herein illustrates exemplary embodiments of the invention, in one form, and such exemplification is not to be construed as limiting the scope of the invention in any manner.

DEFINITIONS

Figure 1:
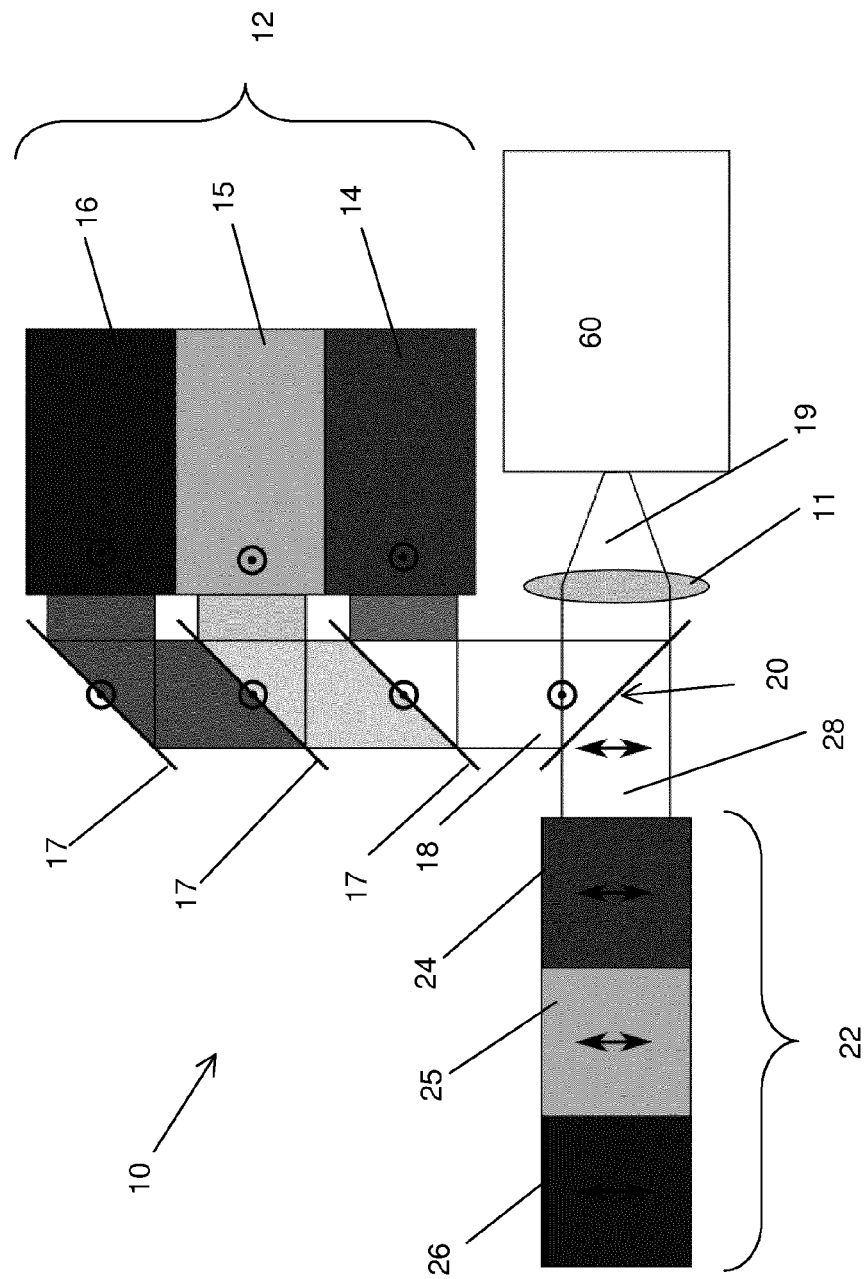
FIG. 1 is a schematic view of an illumination path of a light source apparatus, in accordance with an embodiment of the present invention.

A "multi narrow-band polarizing beam splitter" as used in this invention relates to a polarizing beam splitter with a multiple, e.g. 3 or more narrow band filters. This enables several laser light beams, each of which is collimated and has a narrow bandwidth, to be directed optically (reflected or transmitted) by the beam splitter dependent upon the polarization of the laser light beam. Advantageously, the narrow spectrum allows use of the polarizing beam splitter over three separate narrow spectral ranges instead of over the complete visible spectrum. In embodiments of the present invention this can lead to higher efficiencies. The spectral ranges of the multi narrow-band polarizing beam splitter should be matched to the spectral range of the laser light beams. For example, dependent upon the spectral range of the lasers the width of the spectral ranges of the PBS can be up to 30 nm. If the laser has a narrower spectral range, the PBS should preferably be designed to match the laser spectral range more closely as this can bring greater efficiencies e.g. the PBS spectral width could be up to 25 nm or up to 15 nm. If the laser light beams have narrower spectral ranges, then the PBS design should preferably be selected which match these ranges.

"Rugate coatings" are optical interference films where the refractive index of the film continuously and periodically grades as a function of the film's optical thickness. Rugate filters can be used as narrow reflection notch filters. By varying the index profile sinusoidally, rather than as a square wave, and by controlling the index excursion, very narrow notch filters free of higher order harmonics can be produced.

DESCRIPTION OF PREFERRED EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Referring to FIG. 1, an illumination path of a light source apparatus 10 is schematically illustrated in accordance with an embodiment of the present invention. Light sources 12 and 22 provide light beams that are directed through dichroic color filters 17, and through a multi narrow-band PBS 20 to an integrator assembly 60 via a condenser lens 11. It should be appreciated that the light beams are sent through the PBS in the opposite direction from when the PBS is used as a beam splitter. Hence the PBS is used as a beam combiner. Light sources 12 and 22 may be laser light sources, such as semiconductor lasers, arranged to output laser light beams 14, 15, 16 and 24, 25, 26, respectively. Light source 12 may provide a first set of laser light beams at multiple wavelengths or wavelength ranges for three or more primary colors, such as a red laser light beam 14, a green laser light beam 15, and a blue laser light beam 16. The different wavelength ranges may optionally comprise different wavelengths for the same primary colour. Light source 22 may provide a second set of laser light beams at matching wavelengths, e.g. with three or more primary colors such as a red laser light beam 24, a green laser light beam 25, and a blue laser light beam 26. The laser light beams 14, 15, 16 may be first combined by overlaying using a filter such as dichroic color filters 17 to create a polarized white laser light beam 18. Accordingly, the laser light beams 24, 25, 26 may be first combined using filters such as dichroic color filters (not shown) to create a polarized white laser light beam 28. The orientation of the lasers light beams 14, 14, 16 and 24, 25, 26 may be chosen such that the polarizations of both white laser light beams 18 and 28 are orthogonal to each other. These orthogonal polarization states can also be obtained by the use of a retarder to one or both of the white laser light beams. A PBS 20 may be utilized to combine both polarizations. The white light beam 18 is shown in FIG. 1 as s-polarized and the white light beam 28 is shown in FIG. 1 as p-polarized however the opposite arrangement is possible. Light from the PBS 20 may be directed into any suitable optical arrangement.

In a particular embodiment, after the PBS 20, the combined laser light beam 19 is focused by means of a focusing means such as a condenser lens 11 onto the entrance of an integrator assembly 60. For example, it may further be possible to use the collimated laser light beam 19 directly by means of a fly eye integrator.

An example laser light source 12, 22 uses a set of semiconductor lasers, such as multiple laser emitters or multiple laser packages. Any suitable lasers may be used. For example, red and blue band direct diodes can be used and for green and blue bands, frequency-doubled semiconductor lasers can be used. The advantage of these lasers is that it is possible to obtain a set of wavelength shifted lasers within a limited range of 6 and 4 nm respectively in order to reduce speckle. An example set of wavelengths is:

Red: from 635 nm to 637 nm shifted in wavelength e.g. by modifying the temperature of the junction.
Green: 529.75 nm, 530.70 nm, 531.75 nm, 532.50 nm, 533.75 nm, 534.60 nm.
Blue: 462±7 nm Wavelength diversity is preferably obtained by tuning of semiconductor laser devices. For example, wavelength diversity in green and blue frequency doubled lasers can be achieved by tuning of a VBG and a PPLN doubling crystal. 1 nm spacing in the green band has been found to offer good or even optimal despeckling results for most gain 1 surfaces, such as paper. For example, the 1 nm spread between the wavelength can be used, even though a slightly larger separation might be better (e.g. 1.25 or 1.5 nm) for certain screens. For some silver screens it was found that even larger separations of up to 5 nm can be preferred.

A high-efficient narrow band polarizing beam splitter that can be used with the present invention is described in U.S. Pat. No. 5,828,489. This PBS includes a thin film coating having a refractive index gradient through its thickness. The gradient index film may be placed at a non-orthogonal angle in an embedding medium. The gradient index film may be a rugate filter that is embedded in a supporting optical medium, such as between a pair of joined prisms. The PBS reflects polarized light in narrow spectral regions while transmitting broadband light. As a result, efficient transmission of p-polarizations at all wavelengths and reflection of s-polarizations at specific narrow wavelengths with high transmission of s-polarizations at all other wavelengths is achieved.

A PBS that transmits p-polarizations only in narrow wavelength bands while reflecting s-polarizations over a broad wavelength range can also be used in the present invention. The multi narrow-band PBS 20 in accordance with an embodiment of the present invention may be a multi-layer dichroic coating. Alternatively, the PBS 20 may be a rugate filter that may be embedded in an optical medium, such as glass, (not shown). The PBS 20 may have, for example, the shape of a cube. The PBS 20 may be positioned to receive the two white laser light beams (18, 28) having polarizations that are orthogonal to each other. For example, the PBS 20 may be positioned at an angle of about 45° between the two white laser light beams (18, 28).

Figure 2:
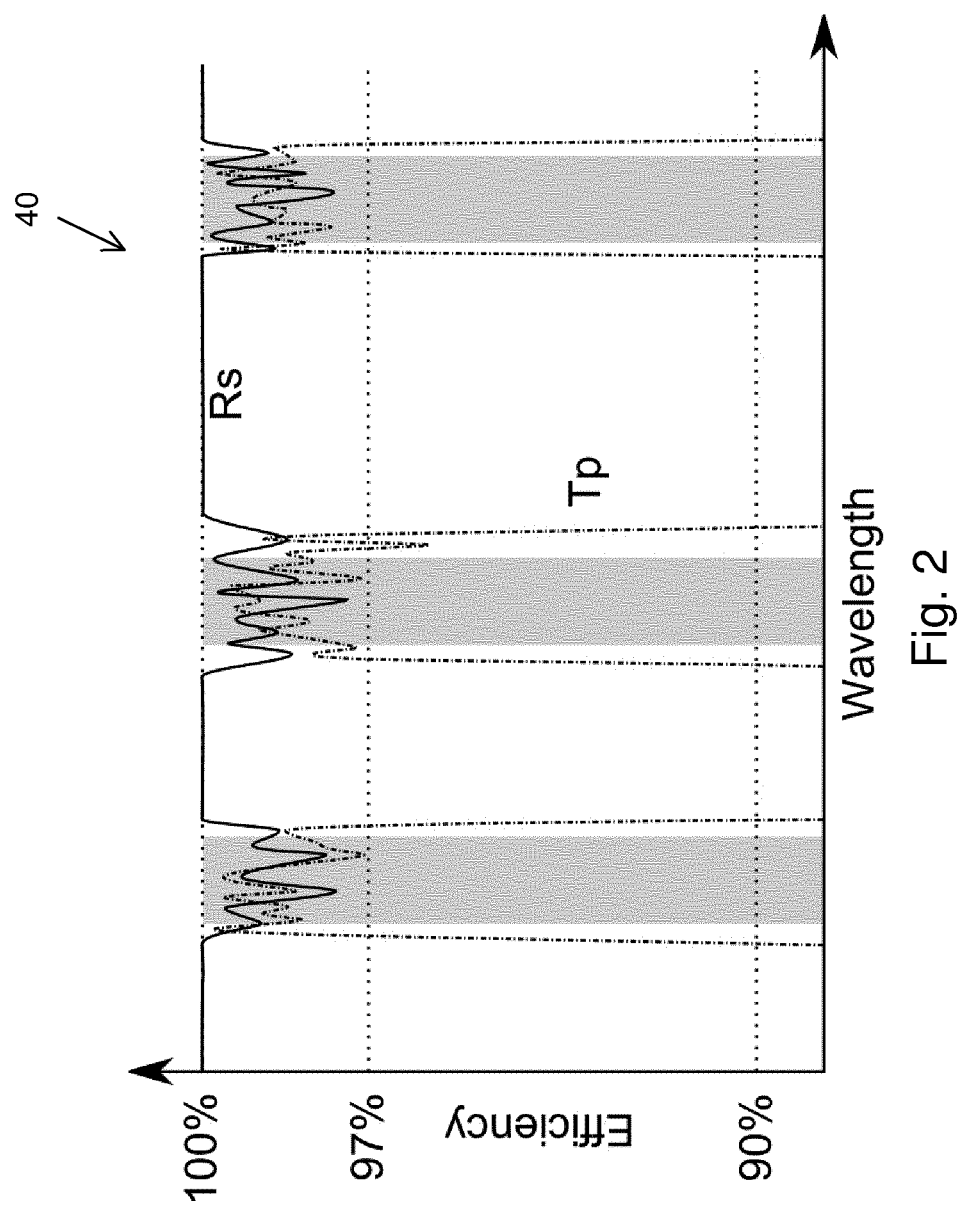
FIG. 2 is a graph of the efficiencies of p-polarization transmittance and s-polarization reflection of a multi narrow-band PBS for a perfectly collimated light beam, in accordance with an embodiment of the present invention.

The characteristics of an example of a multi narrow-band PBS 20 are illustrated in the graph 40 of FIG. 2. Laser light has two advantages with respect to lamps that can be exploited to improve the efficiency of a PBS; laser light is collimated and has a narrow spectrum. As illustrated in FIG. 2, the narrow spectrum of the incident laser light allows optimizing the PBS 20 over three separate narrow spectral ranges, such as the spectral ranges for the colours red, green, and blue, instead of over the complete visible spectrum. Higher efficiencies can be reached. Graph 40 shows the transmission for p-polarized light and the reflection for s-polarized light when the PBS 20 is positioned at 45° in a collimated laser light beam, rather than the 56°-57° of the Brewster angle typically used in the known prior art. As a result, relatively high efficiencies can be reached. As illustrated in FIG. 2, multi narrow-band PBS 20 transmits p-polarized light only in relatively narrow wavelength bands while s-polarized light is reflected over a comparably broad wavelength range. Alternatively, PBS 20 may be designed and positioned to transmit s-polarized light in narrow wavelength bands while reflecting p-polarized light over a comparably broad wavelength range.

Figure 3:
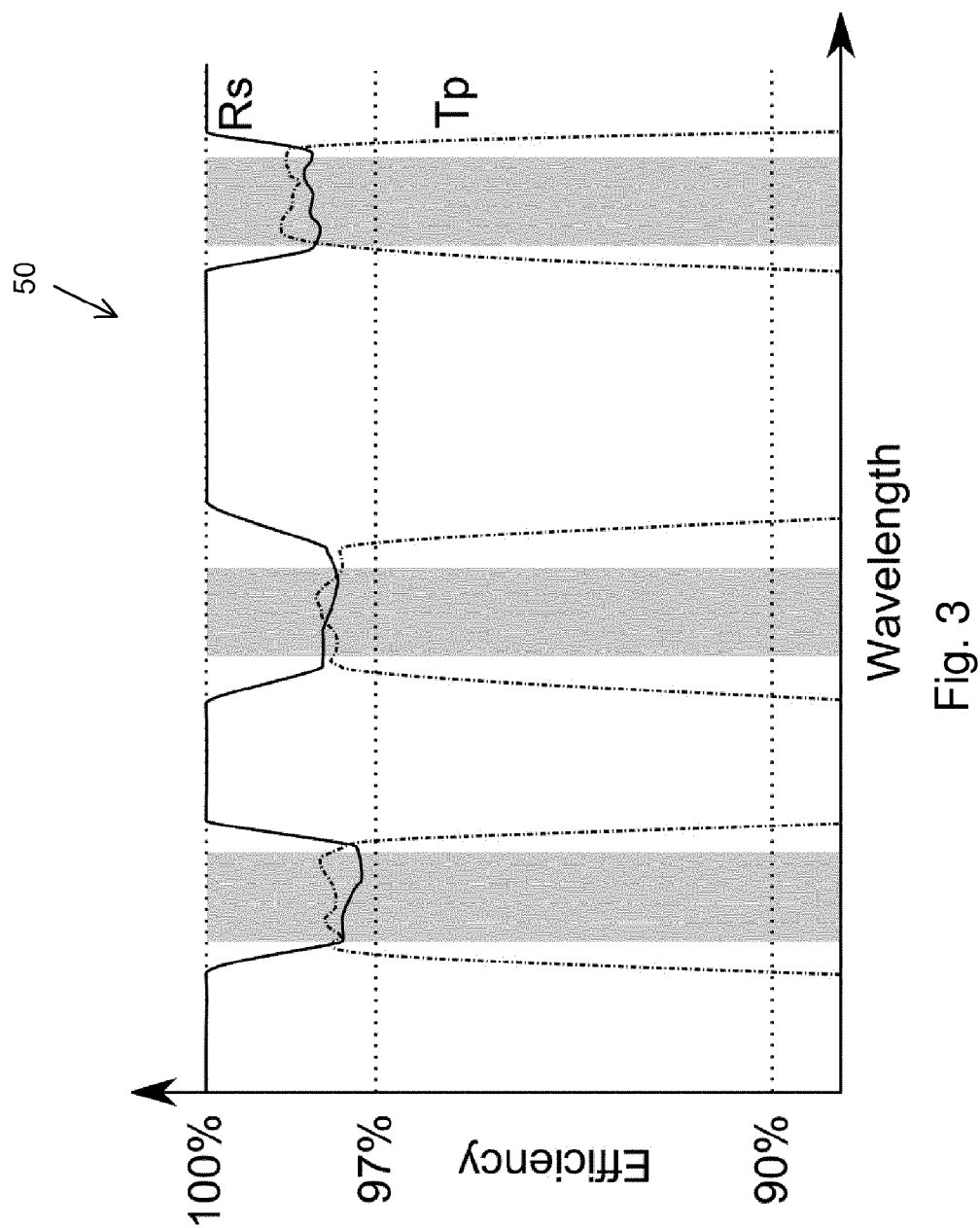
FIG. 3 is a graph the average efficiencies of p-polarization transmittance and s-polarization reflection of an optimized multi narrow-band PBS for a light beam having a cone angle of 5°, in accordance with another embodiment of the present invention.

A disadvantage of dichroic filters or mirrors is their dependency on angles. For example, the edges of graph 40, as shown in FIG. 2, shift towards smaller wavelengths for larger angles of incidence, and vice versa for smaller angles if incidence. This means that the width of a working frequency range of the PBS 20 has to be increased when the cone angle from the light source (12 and 22) increases. Here, the second advantage of a laser light source may be utilized to further improve the efficiency of the PBS 20. The laser beams (14, 15, 16 and 24, 25, 26) are collimated and, therefore, the variation in the angle of incidence is very limited. When a half cone angle of 5° is used for the design of the coating of PBS 20, an overall efficiency exceeding 97% may be obtained within the narrow wavelength bands of the laser beams 14, 15, 16 and 24, 25, 26, respectively, as is illustrated by graph 50 in FIG. 3. This figure shows the average transmission or reflection of a laser beam having a cone angle of 5°.

Figure 4:
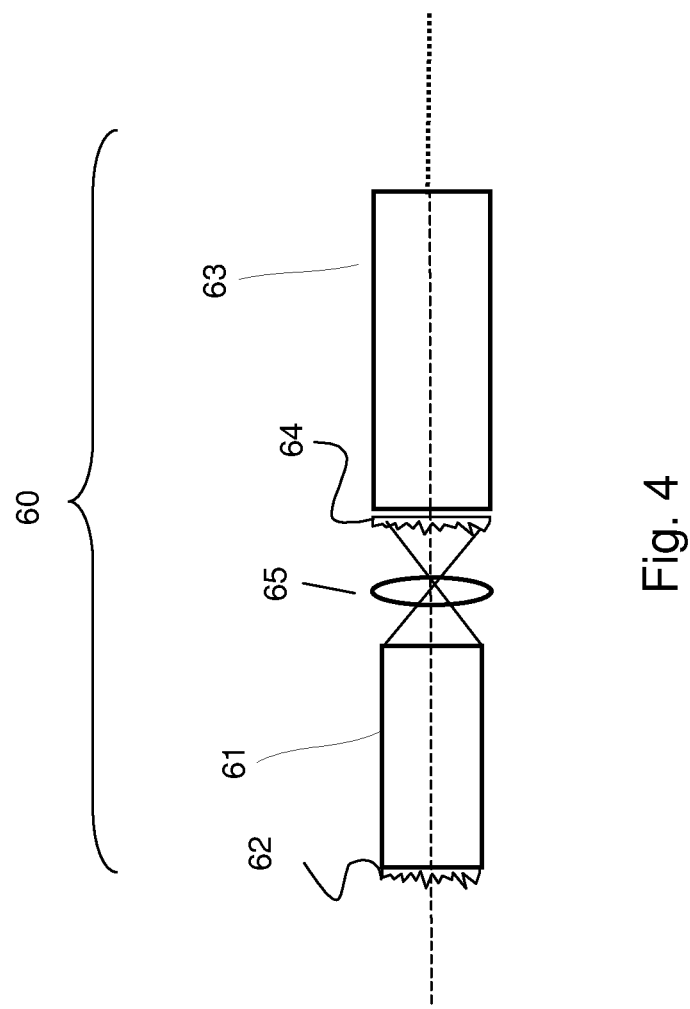
FIG. 4 is a schematic view of an integrator assembly, in accordance with an embodiment of the present invention.
Figure 5:
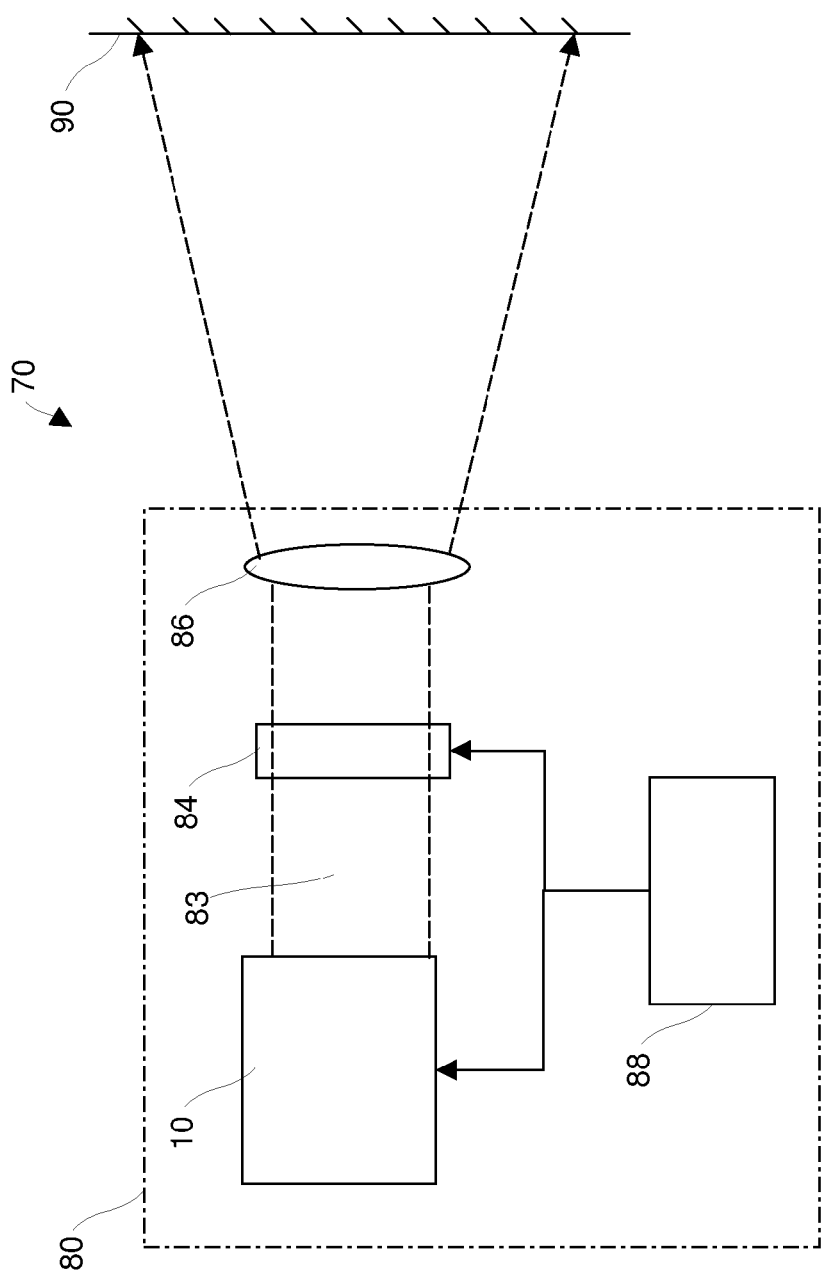
FIG. 5 is a schematic view of a projection system, in accordance with an embodiment of the present invention.

In a particular embodiment of a projector, light source apparatus 10 as illustrated in FIG. 1 may include an integrator assembly 60, as illustrated in FIG. 4. Integrator assembly 60 may include two integrator elements 61 and 63, a first diffuser or refractive element or lenslet array or refractive prism array 62 positioned ahead of integrator element 61, and an intermediate or second diffuser or refractive element or lenslet array or refractive prism array 64 positioned ahead of integrator element 63. Integrator assembly 60 may also be called a "dual integrator". The integrator assembly 60 is adapted to fill the étendue of a projector (for example, projector 80 as shown in FIG. 5) as uniformly as possible, without scattering light over larger angles, which are not accepted by the projectors optical system and projection lens (leading to reduced light efficiency). The two integrator elements 61, 63 are arranged sequentially along a light path between the light sources 12, 22 and light modulator 84 (FIG. 5). The two integrator elements 61, 63 are not shown as being in physical contact with each other but with relay optics 65 in between to image the exit of integrator 61 onto the entrance of integrator 63 and diffuser element 64. However, if there are a sufficiently high number of incoherent laser emitters, such that the motion control of the diffuser element 64 is no longer required, the two integrator elements 61, 63 can be arranged such that they physically connect to one another. Integrator assembly 60 is described in further detail in co-pending PCT patent application PCT/EP2011/055743, hereby incorporated by reference.

Light source apparatus 10 may further be used in a projection system 70 as schematically illustrated in FIG. 5. The optics of such a projection system 70 may be placed downstream of the optics of the light source apparatus 10. Projection system 70 may include a projector 80 and a display surface 90 on which an image is formed. The display surface 90 can be a display screen or some other surface such as a face of a building or water. The projector 80 can be any suitable projector. For example, it can comprise a light source apparatus 10 as illustrated in FIG. 1, a light modulator 84 and a projection lens assembly 86. The light source apparatus 10 generates a beam 83 of light to illuminate the light modulator 84. The light modulator 84 can be a spatial light modulator or light valve, e.g. it can comprise a two-dimensional array of light modulating elements, also called light valve elements. Each light valve element can correspond to a pixel of the image to be displayed and can be individually controlled to allow an amount of light to pass through/be reflected from that element. In a one-dimensional spatial light modulator each light valve element can correspond to more than one pixel of the image to be displayed. For example by the motion of a mirror, the pixels of such a light modulator can be swept across the surface of the screen. The light modulator 84 can use a transmissive technology, such as liquid crystal panels, in which individual elements are switched on, off or a value somewhere between on and off, depending on the amount of light that is required to be transmitted at that pixel location. Alternatively, the light modulator 14 can use a reflective technology such as Digital Light Processing (DLP) or Liquid Crystal On Silicon (LCOS).

Advantageously, the light beam 83 has an even intensity distribution across the surface of the light modulator 84. The present invention is particularly useful with coherent light beams such as those obtained from lasers. In embodiments of this invention, the light sources 12, 22 comprise at least for one of the primary colours a laser light source capable of emitting a high-intensity beam (such as laser light beams 14, 15, 16 and 24, 25, 26, shown in FIG. 1) or a set of laser light sources which are capable of emitting high-intensity beams. Certain light sources 12, 22 have been described in detail above.

The projector also comprises a controller 88 which controls operation of the light sources 12, 22 and light modulator 84. The controller 88 may further be supplied as a separate component.

The invention is not limited to the embodiments described herein, which may be modified or varied without departing from the scope of the invention.

The invention claimed is:

1. A light source apparatus, comprising:
   a first laser light source arranged to output a first white laser light beam with a first polarization;
   a second laser light source arranged to output a second white laser light beam with a second polarization;
   wherein the polarization of said second white laser light beam is orthogonal to the polarization of said first white laser light beam; and
   a multi narrow-band polarizing beam splitter positioned to receive said first white laser light beam and said second white laser light beam for combining said first and second polarizations;
   wherein said multi narrow-band polarizing beam splitter has a half cone acceptance angle smaller than or equal to 5°;

wherein said multi narrow-band polarizing beam splitter is optimized for three separate narrow spectral ranges, whereby said ranges comprising a width up to 30 nm.

2. The light source apparatus of claim 1, wherein said first laser light source comprises a first set of laser light beams at multiple wavelengths for three or more primary colours; and wherein said second laser light source comprises a second set of laser light beams at multiple wavelengths for three or more primary colours.

3. The light source apparatus of claim 2, wherein a plurality of dichroic color filters combine said laser light beams by overlaying thereby creating said first polarized white laser light beam, and wherein a plurality of dichroic color filters combine the laser light beams by overlaying thereby creating said second polarized white laser light beam.

4. The light source apparatus according to claim 1, further comprising an integrator assembly receiving a combined laser light beam with said combined first and second polarizations via a condenser lens.

5. The light source apparatus according to claim 1, wherein said multi narrow-band polarizing beam splitter is positioned at an angle of about 450° between said first white laser light beam and said second white laser light beam.

6. The light source apparatus according to claim 1, wherein said multi narrow-band polarizing beam splitter comprises a multi-layer dichroic coating or a rugate filter.

7. The light source apparatus of claim 6, wherein the coating or filter is embedded in an optical medium.

8. The light source apparatus according to claim 1, wherein said multi narrow-band polarizing beam splitter transmits p-polarized light in narrow wavelength bands while reflecting s-polarized light over a comparably broad wavelength range or transmits s-polarized light in narrow wavelength bands while reflecting p-polarized light over a comparably broad wavelength range.

9. The light source apparatus according to claim 1, wherein said light source apparatus has an efficiency larger than 97%.

10. The light source apparatus according to claim 1, whereby the orthogonal state of the polarization of the first white laser light beam and the polarization of the second white laser light beam is enabled by rotationally moving said first laser light source with respect to said second laser light source.

11. The light source apparatus according to claim 1, whereby the orthogonal state of the polarization of the first white laser light beam and the polarization of the second white laser light beam is enabled by using a retarder to at least one of the white laser light beams.

12. The light source apparatus according to claim 1, wherein said multi narrow-band polarizing beam splitter is optimized for three separate narrow spectral ranges of the colors red, green, and blue.

13. The light source apparatus according to claim 1, wherein said multiple wavelengths are provided in the range of 635 nm to 637 nm for the red color; in the range of 529 nm to 535 nm for the green color; and in the range from 455 nm to 470 nm for the blue color.

14. The light source apparatus according to claim 2, wherein said multiple wavelengths are generated by multiple laser emitters or by multiple laser packages.

15. A projector comprising a light source apparatus according to claim 1.

16. A projection system using a light source apparatus according to claim 1 and including a projector and a display surface on which an image is formed, said projection system comprising a multi narrow-band polarizing beam splitter positioned to receive a first white laser light beam having a first polarization and a second white laser light beam having a second polarization that is orthogonal to said first polarization, wherein said polarizing beam splitter combines said first and second polarizations.

17. A method for providing a light beam for use in a projector having a multi-narrowband polarizing beam splitter optimized for three separate narrow spectral ranges, said ranges having a width up to 30 nm and a half cone acceptance angle smaller or equal to 5°, the method comprising the steps of:
  overlaying a first plurality or laser light beams of different wavelengths to generate a first white laser light beam that is incident on the multi-narrowband polarizing beam splitter and has having a first polarization, overlaying a second plurality or laser light beams of different wavelengths to generate a second white laser light beam that is incident on the multi-narrowband polarizing beam splitter and has having a second polarization that is orthogonal to the first polarization, combining said first and second white laser light beams into a single white light beam so that said first and second polarizations are maintained;
  wherein an overall efficiency of the overlaying and combining exceeds 97%.

18. The method of claim 17, further including the steps of:
  outputting a first set of laser light beams at multiple wavelengths for three primary colours;
  outputting a second set of laser light beams at multiple wavelengths for three primary colors;
  overlaying the first set of laser light beams thereby creating said first white laser light beam;
  overlaying the second set of laser light beams thereby creating said second white laser light beam.

* * * * *